March 19, 1957  J. J. FERNANDEZ  2,785,804
FLUID FILTER
Filed Aug. 20, 1954
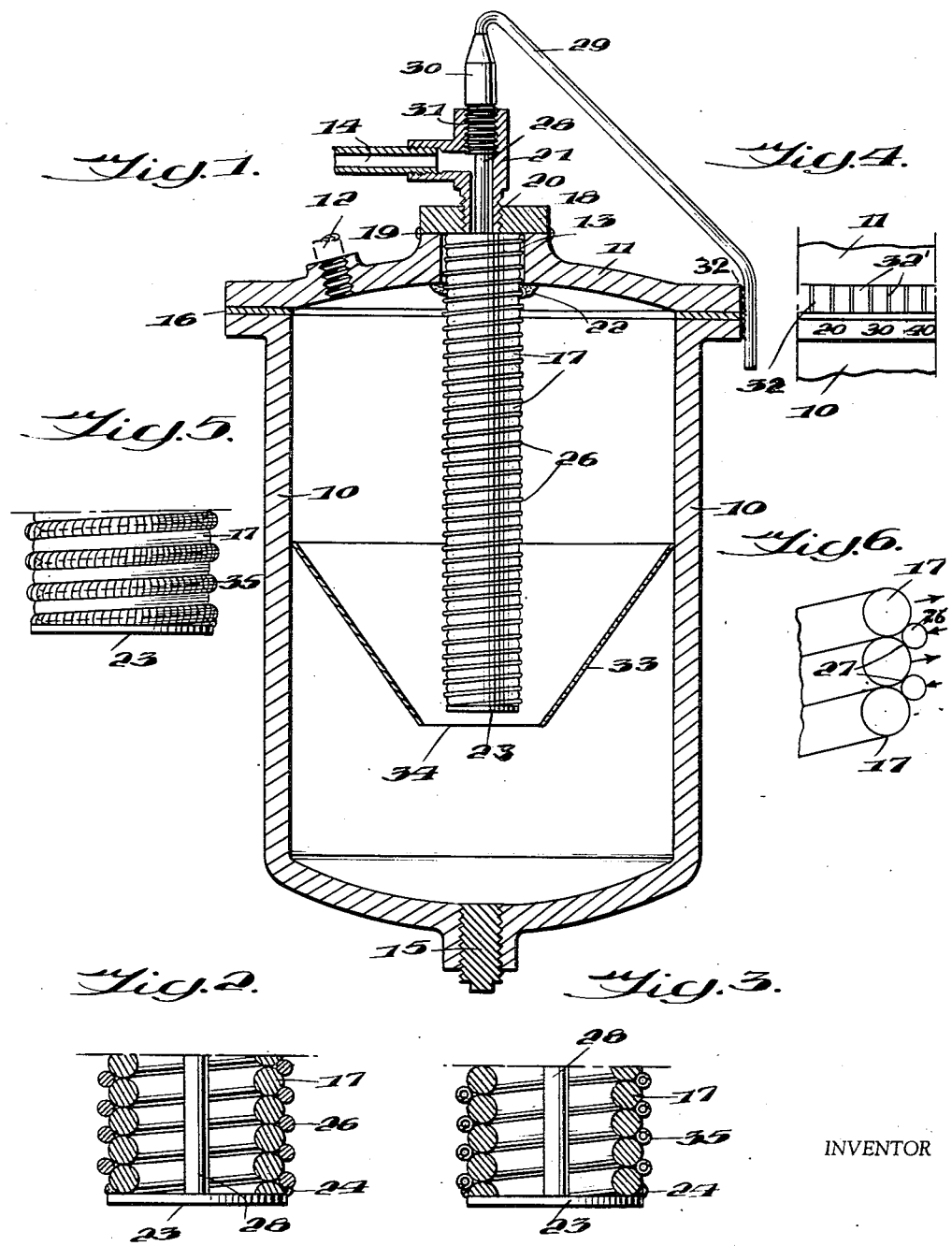
INVENTOR
John J. Fernandez
BY
ATTORNEY

United States Patent Office 2,785,804
Patented Mar. 19, 1957

2,785,804

FLUID FILTER

John J. Fernandez, Baltimore, Md., assignor of one-half to Hugh J. Loftus, Baltimore, Md.

Application August 20, 1954, Serial No. 451,171

6 Claims. (Cl. 210—169)

This invention relates to improvements in pressure filters and more particularly to filters which may be employed for filtering fluids, liquids or gases as the occasion may require.

A filter constructed and arranged in accordance with the present invention contemplates a novel helical coil spring filter for use in filtering fluids of different characteristics such as oil used in automotive lubrication system and the like wherein the oil, which may be of different viscosities, is circulated under a desired predetermined pressure.

One important object of present invention is to provide a novel form of helically wound wire coil spring filter which shall be more dependable in operation and efficient in separating foreign matter from the fluid passing therethrough than similar apparatus heretofore employed.

Another object of the invention is to provide a novel form of spring coil filter unit which may be conveniently applied to can type filter casings now in use either as an attachment or an integral part thereof.

A further object of the invention is to provide a coil spring filtering unit having a novel arrangement of a plurality of inter-leaved coil springs cooperating as a unit to regulate the degree of filtering in a wide range of materials passing through.

A further object of the invention is to provide a pressure filter of the character designated in which the coils forming the filter shall be expandable laterally to provide the desired filtering action in accordance with the characteristics of the fluid handled.

A further object of the invention is to provide a filter of the character designated which shall be durable in construction and require minimum cleaning or attention over long periods of use.

A still further object of the invention is to provide a filter unit of the character designated which shall be conveniently adjusted to handle fluids of different viscosities and indicate the character of fluid being filtered.

A further object of the invention is to provide a coil spring filter in which one of the springs shall be of relatively large cross section area and a second spring of smaller cross section and laid in the crevices of the first spring so as to have different relative differential movements when the coils are expanded transversely.

These and other objects of the invention will be more manifest from the following specification and drawings, and more particularly set forth in the claims.

In the drawings:

Figure 1 is a sectional view in elevation of a filter embodying the invention;

Figure 2 is a sectional view on line 2—2 of Figure 1;

Figure 3 is a modification of the filter wherein the second coil is a helically coiled spring having its coils at right angles to the axis of the main coil spring and tensioned in the crevices formed by the first helically coiled spring coil convolutions.

Figure 4 is a fragmentary front view of an indicator member associated with the filter;

Figure 5 is an enlarged fragmentary front view of the filter illustrated in Figure 3; and Figure 6 is an enlarged fragmentary schematic view illustrating the movement of the spring coils.

Referring to Figures 1 and 2 of the drawings, wherein there is shown a preferred embodiment of the novel filter unit constructed and arranged in accordance with the present invention, the numeral 10 indicates a receptacle or casing which may be of the conventional can type frequently employed in an automotive lubrication system. The casing includes a top wall or cover portion 11 provided with a fluid inlet connection 12, and a central aperture 13 through which the filter connections are made with an outlet connection 14 as hereinafter more fully described. A drain plug connection 15 is located in the bottom wall of the casing 10 for draining off any foreign matter that may collect in the bottom of the receptacle as a result of the filtering operation. The cover 11 forms a sealed closure for the casing 10 by means of a suitable gasket indicated by the numeral 16 or the cover may be welded to the body 10 if desired.

The novel filter unit includes a helically wound coil spring 17 in the form of a tubular longitudinally disposed chamber for receiving fluid from the inlet and delivering it to the outlet 14. The convolutions are preferably of steel wire of relatively large cross-sectional area as shown in Figures 2 and 3, but any material, such as plastic, having inherent resiliency may be employed without departing from the scope of the invention.

The coil spring filter element 17 is suspended in the casing 10 by attaching the upper end coils to a support plate member 18 and secured at the aperture 13 in any suitable manner as by solder or brazing indicated by the numeral 19. The invention further contemplates securing the upper end of the filter coil 17 directly to the casing cover 11 without the necessity of a plate connection and thus make the filter a unitary structure with the cover 11 as a welded unit. Whichever construction is employed, the upper end of the filter coil is fixed rigidly to its support to effect the twisting movement of the filter coils.

The plate 18 is provided with an aperture 20 for receiving a hollow T shaped connection 21 including the outlet 14 and a filter actuator. The upper extremity of the coil 17 is rigidly or integrally attached to cover aperture 13 by solder or brazing as indicated by the numeral 22. The lower extremity of the coil 17 is closed by a disc or plug member 23 rigidly united thereto in any suitable manner as by soldering or brazing 24 to form a torque member for twisting the filter coils as hereinafter more fully described.

Associated with the coil spring member 17 is a second coil spring member 26 of smaller area wound over the convolutions of the first spring and having its coil windings located in the crevices or grooves formed by the adjacent coils or convolutions of the first or larger spring as indicated by the numeral 27.

When the two springs are utilized, the second coil spring filter has its upper and lower coils rigidly united to the larger coils at the upper and lower extremities. With this construction the dual elements are adjustably operated together as a unit to regulate the tension or contact to control the filtering of fluid passing through the coils. The twisting movement of the coils is accomplished by a longitudinally disposed rod member 28 passing through the adjacent ends of the coils and having one end rigidly secured to the coils of the springs by means of the closure plate 23. The rigid connection may be made by any suitable means such as threads, solder or welding. The rod member 28 projects above the top of the fitting connector member 21 and connects with a lever arm 29 by means of a threaded fitting connector portion 30. This threaded fitting is a part of the outlet connection 14 and the threads of the connector portion 30 are relatively fine or low pitch as indicated by the numeral 31 so as to provide a binding and holding action when the rod is twisted to transmit a torque force to cause a lateral expansion of the filter spring coils when it is desired to adjust the filter to accommodate a particular kind of fluid. To further assist the holding action, the arm 29 is bent in the form of a handle to engage a cooperating control member 32 located on the filter casing 10 and having a plurality of spaced notches 32'—32'. These notches are also employed to indicate the adjusted position of the filter springs. When the filter is used on an automotive device using standard grades of oil 20, 30 and 40, for example, the notches may be accompanied by associated indicia markings so that the operator will know how to adjust the filter coils in order to obtain the most efficient results from the filter.

To further aid in the filtering operation, the interior of the filter can 10 is provided with a funnel shaped metal member 33 having an opening 34 terminated below the lower extremity of the spring filter unit. The funnel with its sloping sides causes the heavier particles or foreign matter in the fluid to gravitate down the can body and past the filter and settle in the bottom of the casing and thereby eliminate them from the fluid circuit without passing the filter screen or unduly clogging the filter upon recirculation of the fluid in the system.

Having thus described the novel filter arrangement, the operation is carried out in the following manner. Fluid is admitted to the casing 10 by inlet 12 under pressure and forced through the spring coils forming the filter chamber and thence through the outlet 14 and recirculated in a conventional manner. The degree of filtering is regulated by the interaction of the cooperating coil springs 17 and 26. One important feature of the present construction is that the coils are expanded laterally without any appreciable longitudinal distention or elongation of the spring chamber as a whole. The provision of a large spring coil 17 and a cooperating smaller spring 27 causes a definite ratio of transverse movement during the application of torque which produces a controlled degree of filtering not heretofore attained. As illustrated schematically in Fig. 6 it will be noted that as the larger coils 17 are expanded transversely, the inner coils tend to move inwardly into the larger coil crevices and exert contact pressure commensurate with the torque pressure applied to the actuator rod 28 by the lever 29. The filter coils may be calibrated in tension and so held by the lever 29 and notch 32' so that they may be set with great accuracy to take care of a wide range of fluids having widely different characteristics. While the filter has been shown as calibrated for different grades of oil, it may also be calibrated to take care of liquids such as water and the like.

Having thus described a preferred embodiment of my invention, it is obvious that various changes may be made therein without departing from the scope of the invention as defined by the claims. For example, the coil spring filter elements 17 and 26 may be united directly to the cover 11 and dispense with the plate 18. The second spring may be a helically wound spring element 35 and located in the crevices as shown in Figures 3 and 5. Whichever form of second spring is employed the controlled filtering action is essentially the same. The lateral movement of the larger coil convolution necessarily causes the smaller coil to more closely contact the larger coil crevices by moving inwardly under greater tension and thereby provide a finer degree of filtering adjustment and result.

What I claim is:

1. A fluid filter unit comprising a first helical spring member wound to form a tubular chamber, a second coil spring member wound externally of and about the first spring member, the diametrical cross section of the coils of the second member being less than that of the first member, the coils of the second member resting in the external crevices formed by the coils of the first member, means rigidly securing the ends of the coils to each other and means for twisting both members as a unit.

2. A fluid filter as defined in 1 in which the second coiled member is itself a helically wound coil spring.

3. A fluid filter comprising a support disc having an aperture, a longitudinally disposed coiled spring in the form of a tubular pressure chamber and having one end rigidly connected to the support around the aperture, a second coil spring wound in the crevices formed by the adjacent coils of the first spring closure means at the lower extremity of the coil spring chamber and rigidly secured to said spring, and means engaging the closure means to twist the spring and cause the coil convolutions to expand laterally to regulate the relative contact movement of the two spring coils and thus regulate the passage of fluid through the filter.

4. A fluid filter of the character designated in claim 3 including a rod member extending through the aperture and engaging the bottom closure member of the spring, and a manually operated lever member extending outside the filter for twisting the rod.

5. A fluid filter of the character designated in claim 3 including a rod member extending through the aperture and engaging the bottom closure member of the spring, a manually operated lever member for twisting the rod, and means associated with the lever and outside the filter for indicating the amount of twist.

6. A coiled spring fluid filter unit comprising a first helical spring member of relatively large wire convolutions wound to form a tubular chamber, a second coil spring wound exteriorly of and about the first spring member and having its convolutions of different character laid in the crevices formed by adjacent coils of the first spring, means for rigidly securing the ends of the springs to each other and to a support, manually operated means for twisting both springs to cause a relative lateral tension movement between the adjacent convolutions of both coils, and means cooperating with the manual means for positively retaining the springs in adjusted tension position to regulate the quality of filtering.

References Cited in the file of this patent

UNITED STATES PATENTS

| 408,487 | Jewell | Aug. 6, 1889 |
| 707,611 | Monjeau | Aug. 26, 1902 |
| 2,100,266 | Perry | Nov. 23, 1937 |
| 2,183,100 | Holland | Dec. 12, 1939 |
| 2,451,067 | Butler | Oct. 12, 1948 |
| 2,487,769 | Ebert et al. | Nov. 8, 1949 |
| 2,699,260 | Komline | Jan. 11, 1955 |

FOREIGN PATENTS

| 683,227 | Great Britain | Nov. 26, 1952 |